United States Patent [19]

Harle et al.

[11] 3,907,470

[45] Sept. 23, 1975

[54] GEAR MACHINE

[75] Inventors: Hermann Harle; Siegfried Eisenmann, both of Aulendorf; Kurt Sickinger, Sigmaringen, all of Germany

[73] Assignee: Furstlich Hohenzollernsche Huttenverwaltung Laucherthal, Germany

[22] Filed: Dec. 26, 1973

[21] Appl. No.: 427,671

Related U.S. Application Data

[63] Continuation-in-part of Ser. No. 173,110, Aug. 19, 1971, Pat. No. 3,782,040.

[30] Foreign Application Priority Data

Apr. 13, 1973  Germany............................ 2318753

[52] U.S. Cl.................................. 418/170; 418/150
[51] Int. Cl.$^2$.......................................... F04C 1/06
[58] Field of Search ........... 418/150, 166, 167, 168, 418/169, 170, 171

[56] References Cited
UNITED STATES PATENTS

| | | | |
|---|---|---|---|
| 2,433,360 | 12/1947 | Haight................................. | 418/170 |
| 2,601,288 | 6/1952 | Hill..................................... | 418/169 X |
| 2,601,397 | 6/1952 | Hill et al............................. | 418/169 |
| 3,619,093 | 11/1971 | Harle................................. | 418/171 X |

FOREIGN PATENTS OR APPLICATIONS

| | | | |
|---|---|---|---|
| 912,425 | 8/1946 | France................................ | 418/167 |
| 1,157,458 | 7/1969 | United Kingdom.................. | 418/170 |

*Primary Examiner*—C. J. Husar
*Assistant Examiner*—Leonard Smith
*Attorney, Agent, or Firm*—James E. Bryan

[57] ABSTRACT

A gear machine (either a pump or a motor) having a housing, an internally-toothed, annular gear wheel rotatably positioned in the housing and having from 9 to 15 teeth, an externally-toothed pinion adapted to mesh with the annular gear wheel and having two teeth less than the annular gear wheel, the diameter of the addendum circle of the annular gear wheel being smaller than the diameter of the addendum circle of the pinion, and a generally crescent-shaped filler piece radially filling and extending over a predominant portion of the length of the free space between the addendum circle surface of the pinion and the addendum circle surface of the annular gear wheel on the side of the machine opposite the point of deepest tooth mesh of the pinion and the annular gear wheel, the filler piece having one cylindrical surface, on the annular gear wheel side thereof, defined by the addendum circle surface of the annular gear wheel and its other cylindrical surface, on the pinion side thereof, defined by the addendum circle surface of the pinion, whereby the addendum surfaces of the annular gear wheel and the pinion sealably glide along the corresponding cylindrical surfaces of the filler piece and at least the end of the filler piece which is pointing in the direction of rotation is shortened and terminates at a point at which the trailing end of the addendum surface of each tooth of the annular gear wheel comes out of contact with the corresponding cylindrical surface of the filler piece simultaneously with the trailing end of the addendum surface of one tooth of the pinion. The outermost flanks of two adjacent teeth of the annular gear wheel are defined by a circular arc or an arc of a curve equidistant from a hypocycloid. In the latter case, the ratio of the diameter of the rolling circle to the diameter of the fixed circle, by which the hypocycloid is generated, is an aliquant fraction in which the denominator of the fraction is equal to the number of teeth of the annular gear wheel and the numerator of the fraction is at least two and not more than the number of teeth in the annular gear wheel minus two.

28 Claims, 8 Drawing Figures

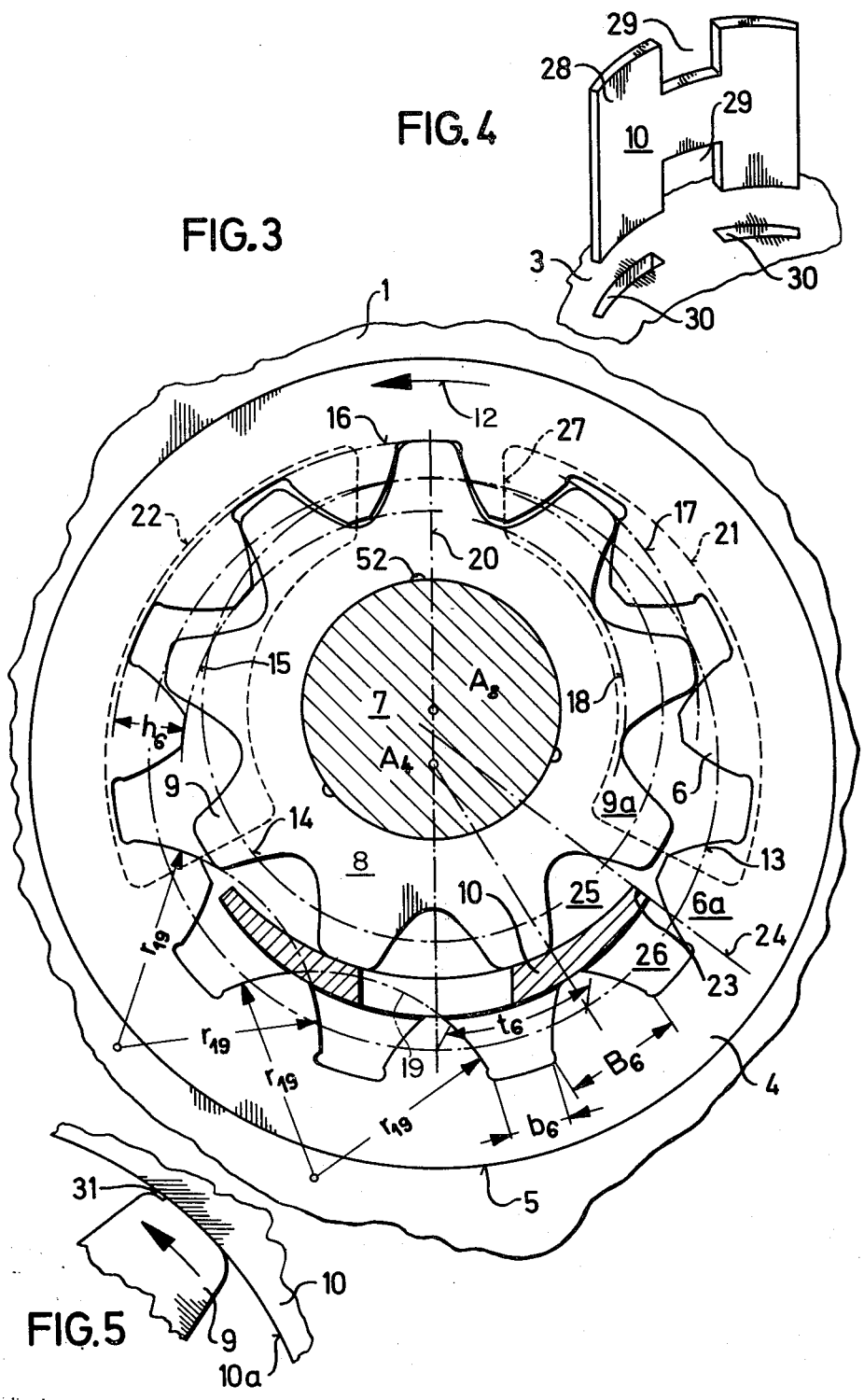

GEAR MACHINE

The present application is a Continuation-in-Part of copending application Ser. No. 173,110, now U.S. Pat. No. 3,782,040, filed by Hermann Harle and Siegfried Eisenmann on Aug. 19, 1971 and entitled "Gear Machine," which application is incorporated herein by reference.

The present invention relates to a gear machine (a gear pump or a gear motor) with an internally-toothed, annular gear wheel rotatably positioned within a housing and having, at most, fifteen teeth, an externally-toothed pinion meshing with the annular gear wheel and a generally crescent-shaped filler piece or member, filling the free space, opposite the point of deepest tooth mesh, between the tip or addendum circles of the pinion and of the annular gear wheel over a substantial portion of the length of such free space, the filler piece or member being defined on the pinion side by the cylindrical tip or addendum circle surface of the pinion and on the annular gear wheel side by the cylindrical tip or addendum circle surface of the annular gear wheel, and on which the tip or addendum surfaces of the annular gear wheel and the pinion sealably slide. More particularly, the present invention relates to a gear machine of the type previously described, preferably a gear pump, wherein the teeth of the annular gear wheel have a generally triangular profile with convexly arched tooth flanks and are continuously tapered from the root or dedendum circle toward the tip or addendum circle to a width at the addendum circle of less than about one-third of the width of the tooth at the root or dedendum circle, the teeth of the pinion are tapered from the root or dedendum circle toward the tip or addendum circle to a width at the addendum circle of less than about two-thirds of the width of the tooth at the dedendum circle to form generally triangular tooth gaps therebetween and the total tooth height or depth of the teeth of the gear wheel and of the pinion is equal to approximately one-tenth of the diameter of the root or dedendum circle of the annular gear wheel.

Gear machines of the latter type are described in the prior art, for example, in Swiss Patent 459,768.

In the construction of gear machines having a high output, significant value is placed on a small number of teeth, since a small number of teeth will result in a low tooth mesh or engagement frequency and consequently a low frequency noise during operation. A small number of teeth is further desirable since it will result in large tooth gaps and hence bring about a large discharge or delivery volume. These considerations have led to the construction of gear pumps, such as those illustrated in FIG. 1 of Deutsche Auslegeschrift (German Application published for opposition) 1,266,134, which have an annular gear wheel with 8 teeth and a pinion with 6 teeth. In pumps as disclosed in this reference, the pinion teeth have an approximately rectangular profile and the same is true of the tooth gaps of the annular gear wheel. In such a gear pump, due to the relatively large, so-called squeezing or fluid compression spaces at the point of deepest tooth mesh or engagement, disturbing pulsations arise which not only result in a disturbing noise but also contribute to a lower degree of efficiency of the pumps. Also, the mesh conditions are unfavorable, in other words, the path on which a given tooth of the pinion and a given tooth of the annular gear wheel make contact with one another is short. This leads to poor sealing, specifically at the point where the suction zone and the pressure zone are adjacent. Finally, another disadvantage of such pumps is the fact that the number of pinion and annular gear wheel teeth have a common divider of two. This magnifies the unsteady operation of the pump. For these and other reasons, these pumps are not suitable for high discharge or lifting pressures and flow volumes.

The above-mentioned difficulties of the structure of German Application 1,266,134, are, to some extent, overcome in the structure of Swiss Patent, 459,768. The tooth form employed in the Swiss patent results in reduced clearance spaces and thus smaller volumes of fluid are squeezed or compressed at the point of deepest tooth mesh of the pinion and annular gear wheel. However, the involute tooth system used therein has the disadvantage that the line of tooth mesh or tooth engagement is a straight line so that the tooth mesh or engagement constantly "jumps from front to rear." A further disadvantage of this known construction is that, because of the sharp-edged pinion teeth, very high surface pressures result between the tip or addendum edges of the pinion teeth and the flanks of the annular gear wheel. In the gear tooth system of this Swiss patent, the height or depth of a tooth of the pinion is greater than the dedendum width of the pinion, whose addendum width, like that of the annular gear wheel, is such that a module in the range of only about 0.5 (pitch diameter divided by the number of teeth) obtains. The tooth flanks of the pinion are plane surfaces while those of the annular gear wheel are slightly convexly curved or arched. However, if the addendum edges of the pinion are rounded off, the mesh or engagement conditions are impaired. The clearance volume in the area of deepest tooth mesh or engagement is still relatively large and, as a result, the quantity of oil squeezed or compressed is also large. Finally, the difference between the number of teeth (15 anular gear wheel teeth and 11 pinion teeth) is relatively large in proportion to the number of teeth in the annular gear wheel, i.e., barely 27 percent. This relationship of the number of teeth permits the use of a relatively stable and long filler piece or member, which has a positive effect on the uniformity of operation and upon the sealing action between the suction and the pressure zones within the filler piece area. However, the large difference in the number of teeth and, hence, the relatively small pinion have the disadvantage that the pinion shaft is necessarily thin, which, in the case of the high discharge pressure that is sought to be obtained in such pumps, will render the perfect positioning of the pinion significantly more difficult.

As compared to this state of the art, the present invention provides a gear pump which, while having practically the same dimensions as the pump of the above-mentioned Swiss patent, not only has at least the same service or useful life but also has about twice the output, all wthout the development of additional noise.

In accordance with the present invention, the diameter of the addendum or tip circle of the annular gear wheel is smaller than the diameter of the addendum or tip circle of the pinion. The annular gear wheel has 9 to 15 teeth and the pinion has 2 teeth less than the annular gear wheel. The cylindrical surfaces of the filler piece or member terminate at the end of the filler piece pointing in the direction of rotation so that, in each case, the trailing edges of the addendum surface of the teeth of the annular gear wheel and of the pinion will simultaneously come out of contact or engagement with the corresponding cylindrical surface. The present invention also makes use of a tooth shape which, having a large module and great tooth depth, permits the use of a small difference in the number of teeth. The selected ratio of the tip or addendum circle diameters of the annular gear wheel and the pinion provides a large discharge or delivery quantity.

Due to the small difference in the number of teeth of the annular gear wheel and the pinion and the great depth or height of the teeth, the distance between the tip or addendum circles of both the annular gear wheel and the pinion is small at the area of the pump furtherest from the area of deepest tooth mesh or engagement. Accordingly, the filler piece is also narrow. Normally, such narrow filler pieces, measured relative to the depth or height of the teeth, can be deformed at the high pressures for which the pumps, according to the present invention, are primarily designed, namely; several hundred atmospheres absolute, due to the liquid pressure resulting from the uneven admission or charge, to such an extent that they wear out rapidly and therefore will no longer fullfill their sealing function. This is effectively prevented in accordance with the present invention by the fact that two tooth gaps, which are located opposite each other and which transport liquid, are simultaneously open toward the space or chamber that follows, when viewed in the direction of rotation of the machine, that is, toward the pressure chamber in the pump, due to the fact that the end of the filler piece, positioned in the direction of rotation of the gear wheels, terminates at a point which brings about this result. Accordingly, this terminal end of the filler piece is uniformly subjected to the pressure fluid so that the short time distortions, which otherwise result, are prevented, in the case of a pump, with a high pressure fluid and, in the case of a motor, with a low pressure fluid. In this manner, a pump according to the present invention combines a small number of teeth of the annular gear wheel and a large number of teeth of the pinion with an improved arrangement of a filler piece or member which has not heretofore been possible.

This arrangement of the filler piece is preferably made in such a manner that the ends of the two cylindrical surfaces of the filler piece, positioned at the end of the filler piece pointing in the direction of rotation, are positioned at least approximately on an axially parallel plane through the center between the axes of the annular gear wheel and of the pinion and through a point on the addendum circle of the pinion, at which point the rearward edge of the addendum surface of each pinion tooth overtakes the rearward edge of the addendum surface of an oppositely disposed tooth of the annular gear wheel. However, the filler piece may also be extended or elongated, by virtue of the fact that the ends of the two cylindrical surfaces of the filler piece are caused to end at different planes through the last-mentioned center. However, in this case, a small force, which presses the filler piece radially outward, arises at the filler piece end.

The number of teeth of the annular gear wheel and of the pinion preferably have no common divider. This also has the effect of achieving a high degree of quietness in operation.

The machine, according to the present invention, is preferably reversible which means that it is preferably constructed symmetrically with respect to the plane through the pinion axis and the annular gear wheel axis. The inlet and the outlet openings of the pump are preferably disposed in either one or in both end walls which define the delivery space or chamber of the pump in the axial direction.

Generally speaking, the preferred tooth form of the pump, according to the present invention, is distinguished from the tooth shape or form of the Swiss patent in that the tooth flanks of the annular gear wheel of the present invention are more markedly arched and the distances between the teeth of the annular toothed wheel, in the circumferential direction with respect to each other, (i.e., the root width of the tooth gaps of the annular gear wheel and hence the width of the gaps), are significantly lengthened and preferably about twice that of the Swiss patent.

It has also been found that a particularly favorable gear tooth system for the pump, according to the present invention, is one in which the width of the teeth of the annular gear wheel at the addendum circle is approximately equal to one-fifth of the width of the teeth at the dedendum circle thereof, whereas the width of the tooth gap of the annular gear wheel at the dedendum circle is approximately equal to 50 to 60 percent of the width of the tooth at the dedendum circle thereof. The curvature of the flanks of the teeth of the annular gear wheel is approximately 10 percent of the height or depth of the flank, which means that, when the arched tooth flank is replaced by a straight line connecting the end points of the tooth flank (tip to root), the highest point or curvature should have a distance from this straight line which is about 10 percent of the length of the straight line. In the above limitations, the rounding-off or rounding of the edges of the tooth tips and roots have not been taken into consideration.

The root or dedendum edges of the annular gear wheel teeth are also advantageously rounded since fatigue stress concentration effects are eliminated thereby.

The width of the teeth at the addendum circle of the pinion is advantageously approximately half of the width of the teeth of the pinion at the dedendum circle. The flanks of the pinion are also advantageously slightly concave. The concave arching of the pinion teeth is advantageously about 5 percent of the flank height or depth. The edges of the pinion tooth tips or addenda are also advantageously rounded. The tooth gap width of the pinion at the addendum circle is equal to or slightly more than than the width of two pinion teeth at the addendum circle. At the root or dedendum circle, the tooth gap width of the pinion is advantageously low. Here, the two adjoining tooth flanks can merge into each other in a rounded portion. The rounding is advantageously kept relatively shallow or flat so that a small tooth gap at the bottom or root of the tooth will still be produced.

The play between the addenda surface and the oppositely positioned tooth root or base should be small. Advantageously, both the addenda and the tooth flanks are ground. However, for purposes of each of manufacture, the bottom or root of the tooth gap is not ground in either case. The play between the addenda surface and the bottom or root of the tooth gap should therefore be only so great that the grinding wheel will securely travel therein.

Both the pinion and the annular gear wheel are preferably hardened or manufactured from a correspondingly naturally hard material. Preferably, both consist of steel.

Preferably, the tooth form of the annular gear wheel is accurately determined first and then the tooth form of the pinion is determined by rolling-off or hobbing of the same in the annular gear wheel.

Preferably, the annular gear wheel has a trochoidal gear tooth system as disclosed in copending application Ser. No. 173,110. The tooth form of the gear system of the present invention differs from that of the above-mentioned copending application by virtue of the fact that the gear machine of the present invention has linear or flat addenda on the teeth of the annular gear wheel and also genuine addendum surfaces, which are produced by slightly shortening the addenda as disclosed in the above-mentioned copending application.

According to a further preferred embodiment of the present invention, the mutually averted or outermost flanks of two adjacent teeth of the annular gear wheel are defined by a common circular arc or, expressed more precisely, by a common circular cylindrical surface. Such a gear tooth system has been described in German Offenlegungsschrift (German Application laid open for public inspection) 2,024,330. However, the gear teeth of this prior German Application do not have genuine addendum surfaces. As compared to this known gear tooth system of the German Application, the gear tooth system of the present invention is constructed so that the depth or height of the teeth of the annular gear wheel is shorter.

Even though it has previously been stated that the maximum number of teeth of the annular gear wheel should be 15, a smaller number of teeth is actually preferred. Preferably, the annular gear wheel has either 11 teeth or 9 teeth. Accordingly, the module becomes comparatively large.

In accordance with the present invention, a gear machine can be constructed in which the trailing edge of the addendum surface of each pinion tooth passes the foremost edge (the edge facing the filling piece) of the exhaust of opening of the working space or chamber between the pinion and the annular gear wheel after the pinion tooth has overtaken the leading edge of the tooth of the annular gear wheel together with which it has simultaneously passed the end of the filler piece or member pointing in the direction of rotation.

A significant advantage of the present invention resides in the fact that it is possible to utilize a filler piece which is rigidly mounted within the housing of the pump and/or motor. This filler piece is preferably rigidly disposed in at least one and preferably in both of the end plates or housing walls which axially define the discharge space or chamber of the machine.

The filler piece has projections, preferably in both sides, which, in each case, are approximately equal to the outer one-third of the filler piece and with which the filler piece is seated within corresponding openings in the walls defining the discharge or delivery space or chamber of the gear machine.

A particular advantage of the gear machine, in accordance with the present invention, resides in the fact that separate, complex pressure-balancing means at the end faces of the gear wheels are not required. The gear wheels may run within a simple cylindrical space or chamber which is merely interrupted by the feed or supply and discharge or outlet openings for the flow medium. This is facilitated by the fact that the pinion is provided with axial passages. These axial passages may be formed either as axial bores or axial grooves in the pinion, which is susequently slid on or shrink-fitted upon the pinion shaft. Such axial passages assure a perfect equalization of pressure at both end faces of the pinion and annular gear wheel, so that the various known and customary axial pressure-equalizing plates are not required if one assures that no significant axial thrust is introduced from the exterior via the pinion shaft. In the construction proposed by the present invention, one is able to utilize a minimum degree of axial play in the gear wheels, which considerably increases the effectiveness of the gear machine. In addition, the play between the addenda of the two gear wheels and the filler piece should be as small as possible. This is best attained by virtue of the fact that the pump is constructed with too small a play between the addenda surfaces of the gears and the filler piece and the machine has been allowed to run in for a period of time at a low speed and with a sufficiently lubricating feed liquid. However, this is counteracted by the arched addendum edges of the pinion which enhance the formation of pressure between the addendum surfaces of the pinion and the filler piece by liquid friction forces, which pressure is undesirable since it can reach very high values. If operation is carried out with the smallest possible play between the addenda surfaces of the gears and the filler piece, it is therefore recommended that small edges or shoulders be provided in the addenda surfaces of the pinion, which shoulders are provided by machining out a small notch of about a few tenths of a millimeter in height or depth. Some of the advantages of the gear machine of the present invention over the previously discussed prior art are set forth hereinafter.

a. Due to the provision of a filler member and despite the very small gap available for the filler member, an increase in the quantity or volume of fluid being transported, up to 25%, is achieved in a machine having outside dimensions which are otherwise identical with prior art machines.

b. The pressure build-up along the relatively long filler piece or member takes place slowly and, as a result, the working noise of the machine is reduced.

c. The pressure rise in the machine is smooth, thus preventing cavitation. Any gas bubbles, which are possibly formed, promptly and slowly pass into solution.

d. The suction and pressure openings may extend to a point close to the ends of the filler piece. This reduces the liquid velocity and increases the suction capacity of a pump.

e. No compressional vibrations arise in the mesh-free or engagementfree areas.

f. The pressure chamber and the suction chamber of the machine have approximately constant sizes so that the instantaneous feed volume fluctuates by only about 1 percent. Such a low value of fluctuation cannot be obtained in comparable pumps of the prior art. This end is achieved by the arrangement and provision of the long filler piece together with the corresponding final configuration of the preferred gear tooth system, which has a loop-form line of engagement or mesh, i.e., a locally, almost firm point of engagement. The pump is nearly free of pulsations and develops a very low noise level.

g. The pump may be designed with a certain degree of tooth flank play, yet this will not cause the volumetric efficiency of the pump to suffer. In addition, the requirements relative to accuracy are lower.

h. The long filler piece acts together with the relatively large number of teeth gliding therealong like a labyrinth packing or gland.

i. The pump is very simple in construction.

The objects and advantages of the present invention will be apparent from the following detailed description when read in conjunction with the drawings wherein:

FIG. 3 is a partial cross-sectional view, taken along the line III—III of FIG. 2;

FIG. 4 is a perspective view of the filler piece of the pump of the previous figures illustrating the method of mounting the filler piece in an end wall of the pump;

FIG. 5 is an enlarged view of the addendum of a pinion tooth of the pump of the previous figures in gliding contact with a portion of the filler piece;

Figure 1:
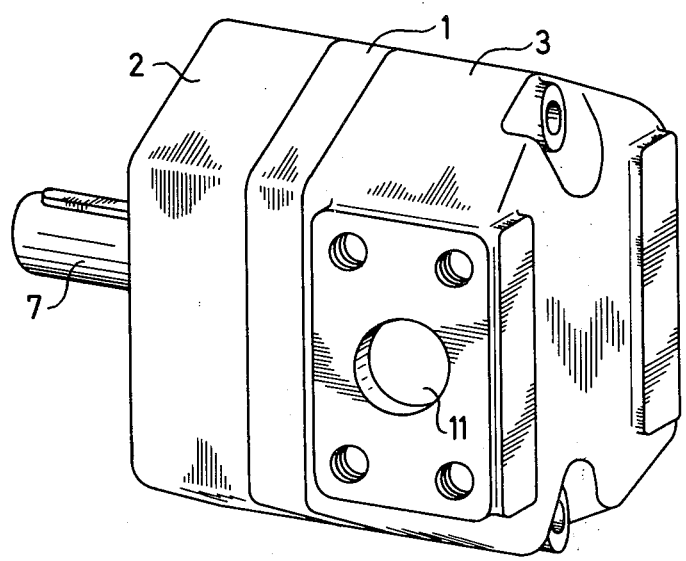
FIG. 1 is a perspective view of a preferred embodiment of a gear pump in accordance with the present invention.
Figure 2:
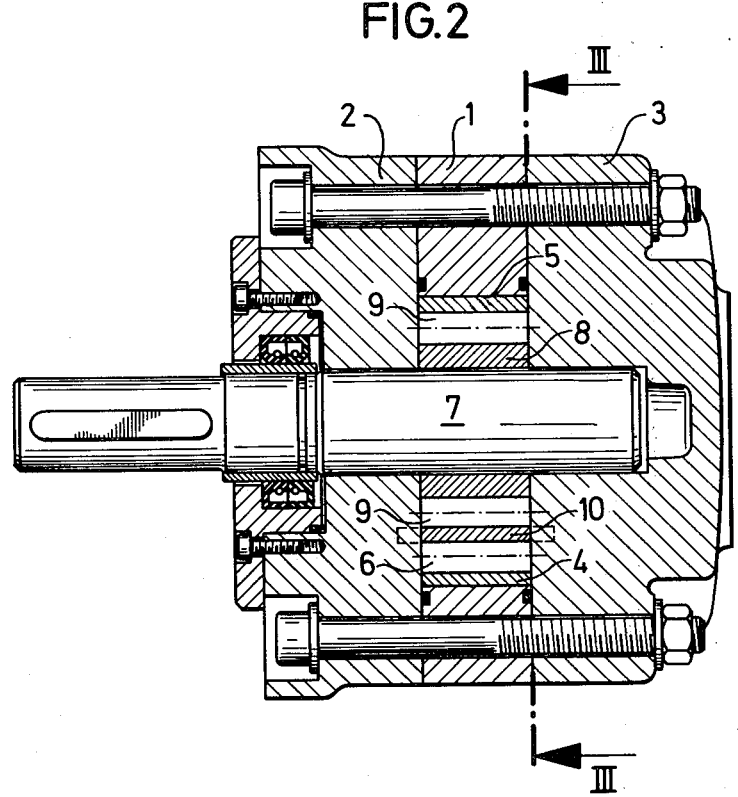
FIG. 2 is a cross-sectional view through the central axis of the pump of FIG. 1.

In accordance with FIGS. 1 and 2 of the drawings, a pump is provided in accordance with the present invention. The casing of the pump comprises an annular, centrally-disposed working chamber 1 with end closures 2 and 3. Rotatably mounted within working chamber 1 of the casing is an internally-toothed, annular gear wheel 4. Annular gear wheel 4 has a circumferential surface 5 in contact with the interior of working chamber 1 and is provided with appropriate teeth 6. Press fit or shrink-fitted on shaft 7 is an externally-toothed pinion 8. Pinion 8 is provided with teeth 9 which mesh with teeth 6 of the annular gear wheel 4. Mounted on the end closures 2 and 3, as will be detailed hereinafter, and positioned between the annular gear wheel 4 and the pinion 8, on the side opposite the point of deepest tooth penetration, is arcuate filler piece or member 10. As shown in FIG. 1, the end closure 3 of the casing is provided with a fluid opening 11.

FIGS. 3, 4 and 5 of the drawings show in greater detail the structural and dimensional relationships of the gear system 4–8 and the filler piece or member 10 of the preferred embodiment of the pump of the present invention. As shown in the drawings, an annular gear wheel 4, whose outer circumferential surface 5 rotates in the direction of the arrow 12 within the central working chamber 1 of the casing, is provided with eleven teeth 6. Rotating within and meshing with annular gear wheel 4 is externally-toothed pinion 8 having nine teeth 9. Disposed between annular gear wheel 4 and pinion 8 is the filler piece or member 10. The pitch, reference or graduated circle of the annular gear wheel 4 is indicated by the dash-dot circle 13, while the pitch, reference or graduated circle of the pinion 8 is indicated by the dash-dot circle 14. Since the pitch circle 13 has a diameter in the illustrated embodiment equal to 100 millimeters, the module of the gear tooth system is about 9.1. A portion of the tip or addendum circle of the annular gear 4 is shown by the dash-dot circle 15, while a portion of the dedendum or root circle of the annular gear wheel 4 is indicated by the dash-dot circle 16. Similarly, a portion of the tip or addendum circle of the pinion 8 is shown by the dash-dot circle 17 and the root or dedendum circle of pinion 8 is shown by the dash-dot circle 18.

The dimensioning and construction of the teeth of the gear system is set forth in some detail in the introductory portion of the present specification. In the embodiment shown, the mutually averted or outermost flanks of two adjacent teeth of the annular gear wheel are defined by a common circular arc 19 having a radius $r_{19}$, as is indicated in FIG. 3 of the drawings. The pitch or graduation of the teeth of the annular gear wheel (in the phase constant) has been shown as $t_6$. The width of the tooth gaps along the root or dedendum circle of the annular gear wheel 4 has been indicated by $b_6$. The width of the teeth of the annular gear wheel 4 along the root or dedendum circle is indicated by $B_6$. The depth or height of the teeth of the annular gear wheel has been indicated at $h_6$. The annular gear wheel 4 rotates about its central axis $A_4$.

The annular gear wheel is rotated by the pinion 8 in the direction of the arrow 12, as previously indicated. The pinion 8 is fixedly attached to the shaft 7 by press-fitting or shrink-fitting. The internal, circumferential surface of the pinion 8 is provided with three axial pressure-equalizing grooves 52 which are uniformly distributed over the circumference thereof. The pinion 8, as previously indicated, has nine teeth 9. The point of deepest tooth mesh is positioned at the top of FIG. 3 of the drawings and, specifically, on a symmetrical line 20.

The outlet opening for the pressure fluid has been indicated by the dashed outline 21 whereas the inlet opening for fluid has been indicated by the dashed outline 22 on the left-hand side of FIG. 3. The inlet opening 22 is, of course, in open communication with inlet opening 11 of FIG. 1. Both openings 21 and 22 are disposed in the end walls of the delivery space or casing of the pump, being positioned behind the drawing plane as shown in FIG. 3. The large extension of the openings 21 and 22 to a point close to the end of filler piece 10 is particularly advantageous. As is also evident from the drawings, the pump further comprises the filler piece 10 whose maximum thickness or depth, like the difference between the radius of the pitch circle 13 and the radius of the tip or addendum circle 15 of the annular gear wheel is approximately equal to a two-thirds module. The difference between the radius of the pitch circle 14 and the radius of the tip or addendum circle 18 of the pinion 8 is equal to about a three-fourths module. It is further apparent from the drawings that the filler piece or member 10 extends over a relatively large portion of the circumference of the gear wheel system even though it is very thin. It is also apparent that the edges of the end surface 23 of the filler piece 10 at the leading or right-hand side of FIG. 3 are positioned on a plane 24 extending parallel to the axis $A_4$ of the annnular gear wheel and through the center between the axis $A_4$ and the pinion axis $A_8$, which plane is passed simultaneously by the rearward or trailing addendum edge of the tooth $9_a$ of the pinion 8, which tooth is just overtaking the tooth $6_a$ of the annular gear wheel 4, and the rearward or trailing addendum edge of the tooth $6_a$ of the annular gear wheel 4. Of course, each tooth 9 passes together with a tooth 6, the positions of the teeth $9_a$ and $6_a$ shown in FIG. 3. As a result, the two fluid transporting chambers or tooth gaps 25 and 26, which following during the revolution or rotation of the pinion 8 and the annular gear wheel 4 are simultaneously connected to the pressure chamber which extends from the end 23 of the filler piece 10 on the right-hand side of the drawing to the left edge 27 of the outlet opening 21. As a result, there will be practically no bending stress on the thin filler piece 10. The end face 23 of the filler piece 10 is so narrow that the slight pressure which becomes effective at that point cannot cause any significant deformation of the filler piece 10. The thickness of the filler piece 10 may be varied, to the extent that the height of the teeth of the annular gear wheel 4 is correspondingly varied. If the latter is increased, the tooth gaps of the pinion 8 must, of course, be correspondingly deepened and vice versa.

The pump shown in the embodiment of the drawings is reversible which means that it is symmetrical with respect to the plane of symmetry 20 through the axis $A_4$ of the annular gear wheel and the axis $A_8$ of the pinion, so that the direction of rotation may be changed or reversed quite readily.

The mounting of the filler piece or member 10 is apparent from FIG. 4 of the drawings. As can be seen from this figure, the filler piece 10 has formed adjacent the ends thereof, in the circumferential direction of the gear machine, lateral projections 28 or, differently expressed, in the central area thereof two notches 29. The projections 28, positioned on both sides of the notches 29, are pressed into two precisely, complementary-formed openings 30 in the end closures 2 and 3 of the casing. The projections 28 may also be glued or soldered into the recesses 30. The filler piece 10 preferably comprises a material which glides well with hardened steel but is softer, such as, for example, a corresponding sliding bronze.

By virtue of the manner of attachment of the filler piece 10 as described above, the filler piece is mounted precisely and immoveably within the casing. After running in of the gear machine, practically no further wear or tear on the filler piece 10 will take place, so that an optimum sealing effect is assured with the simplest design of the structure.

In order to preclude the disadvantages of the rounding-off of the edges of the addenda or tips of the pinion teeth 9, which are leading during the rotation of the gear system, at least one edge is provided with a notch or shoulder 31, which is several tenths of a millimeter in height or depth, so that the leading edge of the pinion tooth 8 grates or scrapes against the inner cylindrical surface $10_a$ of the filler piece 10 during the above-mentioned slow running-in process. After the running-in operation, this small step or edge has the further advantage that dragging or towing pressure is prevented.

If the pump is designed to be reversible, the sharp edge or shoulder 31 would be formed on both edges of each pinion tooth. Otherwise, in a non-reversible pump, the formation of an edge or shoulder 31 on only one side is sufficient.

For the sake of completeness, it should also be pointed out that, in the preferred embodiment of the gear machine according to the present invention, the module is equal to the eccentricity of the two gear wheels i.e., equal to the distance between the axes $A_4$ and $A_8$ of the annular gear wheel 4 and the pinion 8, respectively. The total height of the teeth is usually a little less than one and one-half times the module. The addendum circle diameter of the pinion is preferably from 0.5 to 0.8 modules greater than the addendum circle diameter of the annular gear wheel; preferably it is 0.7 modules greater.

The tooth profile of the pinion is determined by rolling off, or hobbing, in the profile of the annular toothed wheel, as has already been indicated hereinabove.

If the tooth flanks are not determined by circular arcs but by equidistant curves to hypocycloid arcs, as has been explained in further detail in copending application 173,110, each cycloid arc preferably spans, in each case, only two teeth, which means that the mutually averted or outermost tooth flanks of two adjacent teeth are determined in each case by a common equidistant curve to such a cycloid arc. The term cycloid arc is used herein to designate that part of a hypocycloid which extends between the radially outermost points of the cycloid, with respect to the fixed circle or base circle of the cycloid.

When utilized herein, the terms "rolling circle" or "pitch circle" are meant to have their customary meaning in the toothed gear system art, as expalined and illustrated in "Die Zahnformen der Zahnraeder" ("The Tooth Shapes of Gear Wheels"), by H. Trier, Springer-verlag, Berlin, Goettingen, Heidelberg, 1949.

The basic principles involved in the generation of the tooth system of application 173,110 and the tooth system itself can best be explained by reference to FIG. 6 of the drawings. In the gear machine proposed, viewed in a plane normal to the annular gear wheel axis $A_4$, at least the upper half of the height or depth of the tooth flanks of the annular gear wheel 4, and preferably in the upper 4/5's, are defined, by an equidistant curve 32 from a hypocycloid 33 or two like hypocycloids, as will be explained later. The diameter $D_{34}$ of the rolling circle 34 generating the cycloid 33 (or cycloids) by rolling on a base circle 35, concentric about the axis $A_4$ of the annular gear wheel 4, is a fraction of the base circle diameter $D_{35}$. The numerator and denominator of this fraction are integers, the denominator of the fraction equals the number of teeth of the annular gear wheel 4 and, when the numerator of the fraction equals or is greater than two, the numerator and denominator of the fraction have no common submultiple (an aliquant fraction). The equidistant curve 32 is radially outside the cycloid 33 (or cycloids), the annular gear wheel 4 is hardened, the tooth flanks of the annular gear wheel 4 are at least, and preferably, ground in the zones defined by the equidistant curve 32 and the tooth profile of the pinion 8, in the region of mesh, is at least approximately defined by the rolling of the pinion 8 in the annular gear wheel 4.

In accordance with the previously described principles, if the annular gear wheel 4 is to have 9 teeth, for example, then the diameter $D_{34}$ of the rolling circle 34 theoretically may be any fraction of the base circle 35 from one-ninth to eight-ninths, with the exception of three-ninths and six-ninths. Since, when the fraction is one-ninth and eight-ninths, the resultant teeth are arcuate, these values represent Eaton-type gear teeth. For other gears, only the values two-ninths, four-ninths, five-ninths and seven-ninths for the diameter $D_{34}$ of the rolling circle 34 are suitable. Since it can be shown, by mathematical calculation, that two rolling circles 34 and 34' having diameters $D_{34}$ and $D'_{34}$ whose sum is equal to the diameter $D_{35}$ of the base circle 35, generate the same cycloid, only two cycloids are suitable, namely; one having a rolling circle diameter of two-ninths or seven-ninths and the other having a rolling circle diameter of four-ninths or five-ninths. In the latter case, the height of the tooth can be kept low and the gap width sufficiently wide by choosing a distance from the cycloid 33 for the equidistant curve 32 that is sufficiently large.

Where it was stated that the tooth flanks were to be defined by an equidistant curve from two like hypocycloids, this is so because it is sometimes desirable that all the right-hand tooth flanks should be defined by an equidistant curve from one cycloid and all of the left-hand tooth flanks by an equidistant curve from another like cycloid displaced by a small angle with relation to the first, as will be explained hereinafter. Definition by an equidistant curve from one cycloid is possible and is, in fact, preferable when the ratio of the diameter $D_{34}$ of the rolling circle 34 to that of the diameter $D_{35}$ of the base circle 35 is $1/n$ or $(n-1)/n$, ($n$ being an integer). Where hereinafter, in the course of further explanations of the underlying principle, reference is made to only one cycloid, it is to be understood that this includes the use of two cycloids. The omission in the detailed explanations is merely to avoid confusing the issue.

A curve of equal distance or an equidistant curve 32 from the hypocycloid 33 is here understood to be the envelope curve of all circles 36 of like diameter having their central axis 37 on the hypocycloid 33.

The generation of the tooth flanks by an equidistant curve 32 from a hypocycloid 33 enables a precise desired tooth shape to be ground in apparatus in which a grinding wheel, having a diameter equal to circle 36 moves along a hypocycloidal path 33 in relation to the annular gear wheel 4 and the radius $R_{36}$ of the element is equal to the distance of the equidistant curve 32 from the hypocycloid 33. It is technically possible to generate movement along the hypocycloid 33 because a hypocycloid, of the type employed herein, can be generated in the simplest case by rolling the grinding wheel, having a pitch circle equal to the rolling circle 34 of the hypocycloid 33, inside a fixed annular gear wheel 4 having a pitch circle equal to the base circle 35 of the hypocycloid 33. Nevertheless, a different method, that will be later described, is preferred.

However, in order to achieve the objectives hereof, the previously described choice of the tooth flanks is not yet sufficient. To enable such tooth flanks to be ground by the generating roll process, it is necessary that at least all the left-hand or right-hand tooth flanks and then all of the right-hand or left-hand tooth flanks, respectively, or possibly all of the tooth flanks should be ground in one continuous operation in which the roughed-out gear or gear blank needs to be clamped up only once. The latter can be done fairly easily only if the ground part of each tooth is defined by a single cycloidal arc. This results in the generation of a so-called Eaton-type gear tooth in which each tooth has the shape of an equidistant curve from a hypocycloid. This type of gear is used in gear pumps having an internally-toothed, annular gear wheel. However, mesh in the region of the crest is unsatisfactory because of the clearances that are needed between the teeth. In the majority of cases, the above-mentioned condition for an "ogive tooth" must be observed or at least a tooth form having steeper flanks than an Eaton tooth must be employed than would be possible by defining both tooth flanks of a tooth by a single cycloidal arc. This condition again requires that the equidistant curve 32 from the hypocycloid 33, between the two contact points of the cycloid 33 and the base circle 35, should define the remote tooth flanks of two neighboring or still more widely separated teeth. If this is to be achieved in one operation, the cycloid 33 must close upon itself in more than one revolution.

The condition that the cycloid 33 must be closed is, of course, obvious. That the cycloid 33 must close upon itself in more than one revolution or convolution means that the cycloid 33 is generated by the rolling of the generating or rolling circle 34 in which the point tracing the cycloid will not reach its starting position until after having performed at least two complete revolutions about the center $A_4$ of the base circle 35. This is also the preferred and simplest embodiment. If the cycloid 33 reaches the starting point after an even number of revolutions, the number of teeth in the annular gear wheel 4 must be odd. If the cycloid 33 is back where it began after an odd number of revolutions, the number of teeth of the annular gear wheel 4 must be even.

By correctly selecting the ratio of the diameter $D_{34}$ of the rolling circle 34 to the diameter $D_{35}$ of the base circle 35 within the above-described limits, the diversity of choice increases with an increasing number of teeth. In the case of smaller tooth numbers, such as, 7 teeth for the annular gear wheel 4, there is not much room for choice. The diameter $D_{34}$ of the rolling circle 34 to that of the diameter $D_{35}$ of the base circle 35 must be either one-seventh, two-sevenths, three-sevenths, four-sevenths, five-sevenths or six-sevenths. If an Eaton tooth is not desired, only the two possible cycloids defined by the fractions two-sevenths and five-sevenths, respectively, and three-sevenths and four-sevenths, respectively, remain.

The equidistant curve 32 viewed from the inside of the cycloid 33, that closes upon itself in more than one revolution, must run outside the cyloid 33 since it is, in fact, the outer envelope curve defined by the circumference of a cylindrical grinding wheel, whose axis of rotation is parallel to the axis of the rolling circle 34 and whose diameter equals the diameter $D_{36}$ of the circle 36, as its axis follows the hypocycloid 33 and it grinds the tooth flanks. The minimum condition is therefore that the tooth flanks of the annular gear wheel 4 should be ground in the region defined by the equidistant curve 32. The tooth flanks in the region near the root, where high precision is less important, may then be reground by using a dividing head. However, such a procedure is not preferred. The crest of the tooth can be separately ground unless it is formed by a peak or line parallel to the axis $A_4$ of the annular gear wheel 4.

Preferably, both gear wheels may be hardened. More particularly, unground parts of the tooth flanks in cooperative mesh with one another should not make contact, nor should the tooth crests make contact with the bottom of the gaps or roots between the teeth.

Moreover, it is preferred that all the teeth should have a symmetrical contour, as is conventional, and it is also preferred that the number of teeth of the annular gear wheel 4 and of the pinion 8 should have no common submultiple. This is advantageous in production as well as for ensuring smooth running of the gear machine.

The point 38 on the rolling circle 34 generating the hypocycloid 33 (or hypocycloids) is preferably located on the circumference of the rolling circle. Any offsetting towards the inside or outside of the rolling circle 34 should normally be slight.

In order to avoid unfavorable proportions, the tooth height of the annular gear wheel 4, measured from the base circle 35, should preferably be less than 30 percent of the radius $R_{35}$ of the base circle 35. In a still more preferred embodiment, the height of the teeth of the annular gear wheel 4 should be less than 25 percent but greater than 5 percent of the radius $R_{35}$ of the base circle 35.

Moreover, where two equidistant curves are used, it is also preferred that the equidistant curve from the cycloid, defining the left-hand tooth flanks, should clear the right-hand tooth flanks and the equidistant curve from the cycloid, defining the right-hand tooth flanks, should clear the left-hand tooth flanks. This ensures that the grinding element will make contact with only one tooth flank at a time, an advantage from the production point of view. The desired result can be readily achieved by first grinding all the left-hand or right-hand tooth flanks, then slightly turning the annular gear wheel 4 about its axis $A_4$ or shifting the grinding disc far enough from the latter to engage the right-hand or left-hand tooth flanks, respectively. In this procedure, all the left-hand tooth flanks are defined by an equidistant curve from a cycloid which is angularly displaced from an equidistant curve from the cycloid for generating the right-hand tooth flanks. Thus, this is the case in which two cycloids are used. It is quite possible to do without this condition. However, in the latter case, the grinding wheel will be called upon to grind at two points simultaneously when it passes through the cycloid cusps. Nevertheless, this can be avoided by slight relief of that portion of the tooth flank adjoining the root during the roughing-out and prior to hardening. However, the supporting part of the tooth flank will thus be somewhat reduced.

If it is desired to observe the condition that was described as advantageous at the beginning of the last paragraph (grinding the left- or right-hand tooth flanks first and then the right- or left-hand tooth flanks, respectively), the distance of the equidistant curve 32 from the cycloid 33 preferably should be slightly less (preferably 5 to 20 percent or more, particularly about 10 percent less) than half of the linear distance between the ground zones of the facing flanks of neighboring teeth and the annular gear wheel 4 where these zones are closest together.

As a general rule, the distance between two facing tooth flanks of neighboring teeth of the annular gear wheel 4, measured along the base circle 35, will be roughly equal to the width or the distance between the tooth flanks of a tooth along the base circle 35 (which is equivalent to the pitch circle of the annular gear wheel 4).

The tooth flanks need not be ground down to the root. Frequently, it will be sufficient if the tooth flanks are ground from the tip of the tooth to the base circle 35 of the cycloid 33, (or cycloids). The depth of engagement is then limited to that part of the tooth flanks that extends between the tip of the tooth and the base circle 35. The other parts of the tooth flanks must naturally be machined out sufficiently to prevent contact with the teeth of the pinion. When the teeth of the annular gear wheel 4 have crests with flat tops in the circumferential direction of the addendum circle, it may be advantageous to provide tip relief prior to hardening and grinding.

As is generally conventional, the shape of the tooth flanks of the pinion 8 of a gear machine is defined only in principle by the rolling of the pinion 8 in the annular gear wheel 4. Otherwise, no clearance between the teeth would be present.

Preferably, at least the upper half of the tooth flank profile of the pinion 8 is generated by rolling the pinion 8 in an auxilliary annual gear wheel which has tooth flanks that, at least in their upper halves, are defined in sections normal to the axis $A_4$ of the annular gear wheel 4 by arcs 39 (FIG. 7) of circles. These arcs 39 touch the equidistant curve 32 defining tooth flanks of the annular gear 4 at least approximately at the tip of the tooth. The radius of the arcs 39, which should envelop the equidistant curve 32 (or curves) as closely as possible, is equal to or slightly greater than the radius of curvature of the equidistant curve 32 at the point of contact. The relatively remote tooth flanks facing the cusps of the embracing cycloidal arc 39 of two teeth of the auxilliary annular gear wheel are defined by a common circular arc 39 at least in the upper half of the teeth. The relatively remote tooth flanks are the end flanks of a group of adjacent teeth, equal in number to the denominator of the above-mentioned fraction. At least the upper half of the tooth flanks of the pinion 8 are ground. Such a design has the great advantage that the grinding of the tooth flanks can be accomplished with the aid of a grinding means that is deflectable about an axis parallel to the axis of the grinding element.

In the alternative, a relatively complicated arrangement is necessary for grinding tooth flanks of the pinion 8. Yet another possibility of grinding the tooth flanks of the pinion 8 consists of grinding them with the aid of a dividing head. In the case of the pinion 8, this is more acceptable than in the case of the annular gear wheel 4. However, the tooth contour described in the first part of this section, which can be produced by the generating roll process, is preferred.

The method of grinding the tooth flanks of the annular gear wheel consists of rotating the annular gear wheel 4 about its axis $A_4$ at a predetermined speed, superimposing upon this rotation about the axis $A_4$ of the annular gear wheel 4 a second rotation about a second axis 51 which is parallel to the axis $A_4$ of the annular gear wheel 4 and located at a distance therefrom equal to the radius $R_{35}$ of the base circle 35 minus the radius $R_{35}$ of the rolling circle 34, the ratio of the speed of rotation of the annular gear wheel 4 about its axis $A_4$ to the speed of the superimposed rotation being equal to the ratio of the radius $R_{35}$ of the base circle 35 minus the radius $R_{34}$ of the rolling circle 34 to the radius $R_{35}$ of the base circle 35 of the cycloid 33. Both rotations proceed in the same direction, if the rolling circle 34 is the smaller of the two possible rolling circles 34 and 34', and in the contrary directions, if the rolling circle 34' is the greater of the circles 34 and 34'. Consequently, the axis 37 of the grinding cylinder 36, which runs parallel to the second eccentric axis 51, is moved perpendicularly to its axis only for the purpose of infeeding the grinding cylinder 36 as material is removed from the interior of the annular gear wheel 4. This infeeding motion is in a direction away from the second axis 51. BY proceeding in this way, the grinding cylinder 36 is conducted, in relation to the annular gear wheel blank 4, in such a way that the circumference of the grinding cylnder 36 defines the desired equidistant curve 32 of the hypocycloid 33.

Conveniently, the rotating grinding cylinder 36 is reciprocated in its axial direction during grinding, as is conventional.

If it is desired to generate an annular gear wheel 4, in which each equidistant curve 32 from the arc of the cycloid 33 makes contact with only one tooth flank (cycloidal arc is here understood to be the arc of a hypocycloid 33 between two consecutive radial end points), i.e., in the event it is not desired that the grinding cylinder 36 grind two tooth flanks at the same time when its axis passes through the cusps of the cycloid 33 and appropriate clearance has not been machined into the annular gear wheel blank 4, then it is preferred, after finish grinding all the left-hand or right-hand flanks, returning the grinding cylinder 36 to its starting position and turning the annular gear wheel 4 about its axis $A_4$, without rotation of the second axis 51, a sufficient distance in relation to the grinding cylinder 36 so that the latter now grinds the right-hand or left-hand tooth flanks, respectively.

Instead of turning the annular gear wheel blank 4, the grinding cylinder 36 could just as well be displaced a corresponding distance along a line normal to the center axis of the tooth gap in which the grinding cylinder 36 happens to be. Thus, shifting the grinding cylinder 36 is simpler than turning the annular gear wheel blank 4.

The method of the copending application 173,110, for grinding the tooth flanks of the pinion 8 of the gear machine, comprises rotating the pinion 8 about its axis at a given speed, superimposing upon this speed about this axis of the pinion 8 a second rotation at a different speed about a second axis extending parallel to the axis of the pinion 8 at a distance equal to the difference between the radii of the pitch circles of the annular gear wheel 4 and the pinion 8. The ratio of the speed of the pinion 8 about its axis to that of the superimposed rotation being equal to the ratio of the difference between the radii of the pitch circles of the annular gear wheel 4 and the pinion 8 to the radius of the pitch circle of the pinion 8, both rotations being in contrary directions and the tooth flanks being machined during this motion by the generating roll process.

However, if it is desired to use a gear shaper for the pinion 8, then machining is preferably performed by a shaping tool, having the profile of at least part of the teeth of the annular gear wheel 4, reciprocated parallel to the axes of rotation without moving perpendicularly to the second axis, apart from the infeed necessary to allow for progressive removal of material.

If the flanks of the pinion 8 are to be ground, machining is preferably done with the aid of a grinding cylinder 36 which is parallel to the axes of rotation. The grinding cylinder 36 is reciprocated along an arc 39 (FIG. 7) normal to the axes of rotation, the arc enveloping the equidistant curve in the region in which the tooth flanks are to be ground. The swiveling radius through the grinding cylinder 36 passes continuously through a point which rotates about the second axis at the same speed as the latter, and which is at a distance from the second axis equal to the radius of the pitch circle of the annular gear wheel 4.

The process can be performed so that, after a left-hand or right-hand flank of one tooth has been ground, the grinding cylinder 36 is withdrawn, in the direction of its axis, out of engagement with the pinion 8, after traversing the gaps between the intermediate teeth of the particular group, the grinding cylinder 36 is reengaged with the pinion 8 to grind the last tooth of the group and so on. Finally, after all the left-hand or right-hand tooth flanks, respectively, have been finish-ground, either the direction of rotation of the two axes is reversed or the pinion 8 is merely turned over and all the right-hand or left-hand tooth flanks, respectively, are ground. This procedure has the advantage that every useful number of teeth on the pinion 8 can be ground this way.

An alternative procedure for grinding the pinion 8, wherein the ratio of the odd number of teeth to the number of teeth of the generating annular gear wheel 4 equals the ratio of the rolling circle 34 of the cycloid 33 for generating the teeth of the annular gear wheel 4 to the base circle 35 of the cycloid 33, consists of axially withdrawing the grinding cylinder 36, in a direction contrary to the circumferential direction of the pinion 8, out of engagement with the pinion 8 when the flanks and tip of the tooth have been ground, traversing a complete arc of a circle enveloping the cycloidal arc 39 embracing only one tooth gap of the annular gear wheel 4, returning the grinding cylinder 36 across the following tooth of pinion 8 and reengaging the same with the pinion 8 to grind the next succeeding tooth and repeating the cycle until the grinding of the pinion 8 has been completed. This process has the advantage that all tooth flanks and tips of the pinion 8 are machined without repositioning the pinion 8 and without undesirable clearance being created in the gear machine.

In both of these procedures, the shape of the ground tooth flanks of the pinion 8 does not conform precisely with the theoretical shape required by the corresponding annular gear wheel 4. In fact, the tooth flanks of annular gear wheel 4 generating the pinion 8 (in the geometrical meaning of the word), which, as such, have the shape of part of the equidistant curve 32 from a hypocycloid 33, are replaced by a shape approximating arcs of circles 39. However, the approximation is very good and the apparatus need not be complicated. An essential feature of this procedure is that the arc of a circle 39 replacing a portion of the equidistant curve 32 may touch the latter at only one point and must otherwise extend between the equidistant curve 32 and the arc of the hypocycloid 33 to which the equidistant curve relates. The distance of this arc of a circle 39 from the equidistant curve 32 naturally should be as small as possible at all points. Furthermore, the arc of a circle 39 should embrace two tooth flanks that are relatively remote and each should face one adjacent cusp of the same cycloidal arc.

The performance of the above-described methods for producing both the annular gear wheel 4 and the pinion 8 will be aided by a brief description of apparatus for carrying out these methods. Such apparatus is explained and illustrated in greater detail in copending application 173,110.

In the apparatus for grinding the annular gear wheel 4, one of two relatively eccentric parts of an eccentric shaft is rotatably mounted in a baseplate and the eccentricity of the two parts of the eccentric shaft is equal to the difference between the radius $R_{35}$ of the base circle 35 and the radius $R_{34}$ of the rolling circle 34 of the cycloid 33. The free part of the eccentric shaft rotatably carries a table to which the annular gear wheel 4 can be clamped and the eccentric shaft and the rotatable table are driven through gearing at different speeds. The ratio of the speed of rotation of the eccentric shaft to the speed of rotation of the table, rotatably mounted on its eccentric part, is equal to the ratio of the radius $R_{35}$ of the base circle 35 to the difference between the radius $R_{35}$ of the base circle 35 and the radius $R_{34}$ of the rolling circle 34 of the cycloid 33. A grinding means which is fixed in relation to the baseplate is provided having a grinding spindle extending parallel to the axes of the eccentric shaft and the grinding spindle is radially displaceable in relation to the bearings of the eccentric shaft in the baseplate.

When an annular gear wheel 4 is clamped up on the table, a grinding means attached to the baseplate performs a movement in relation to the annular gear wheel 4, that rotates with the table, which follows the cycloid 33 defining the shape of the teeth of the annular gear wheel 4.

Figure 7:
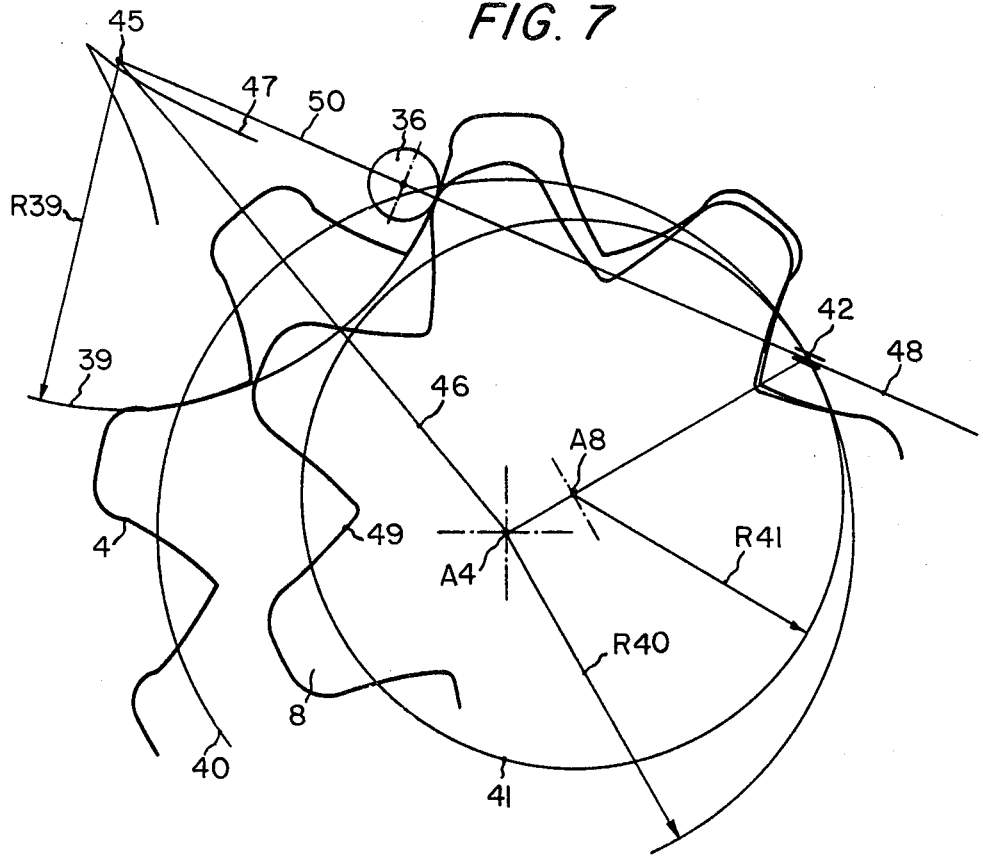
FIG. 7 illustrates the geometrical relationships of a pinion useful with the annular gear wheel of FIG. 6 and a method of forming the same.

In the apparatus for machining the pinion 8, reference is made to FIG. 7. Specifically, one part of an eccentric shaft comprising two relatively eccentric parts is rotatably mounted in a baseplate of the machine, and the eccentricity of the two parts of the eccentric shaft equals the difference between the radii $R_{40}$ and $R_{41}$ of the pitch circles 40 and 41 of annular gear wheel 4 and pinion 8, respectively. The portion of the eccentric shaft not mounted in the baseplate of the machine rotatably carries a working table, and the eccentric shaft and the working table are drivable at different speeds. The ratio of the speed of the eccentric shaft to the speed of the table equals the ratio of the radius $R_{41}$ of the pitch circle 41 of pinion 8 to the difference between the radii $R_{40}$ and $R_{41}$ of the pitch circles 40 and 41 of the annular gear wheel 4 and the pinion 8, respectively, and the baseplate carries means for machining the tooth flanks of the inner wheel.

For grinding the tooth flanks of the pinion 8, the apparatus is conveniently so arranged that the means for machining the tooth flanks of the pinion 8, comprise a grinding wheel 36 which is deflectable on an arm along line 50 about an axis at point 45, which is fixed in relation to the baseplate and parallel to the axis of the eccentric shaft, and this axis at point 45 is offset from the eccentric shaft bearings in the baseplate at an appropriate distance for a circular arc 39 about the axis at point 45 to approximate and envelop at least one and preferably two tooth flanks of the annular gear wheel 4. The grinding wheel 36 is so mounted on the arm that its envelope curve during deflection about the axis at point 45 traverses the circular arc 39 and means are provided for moving the grinding wheel 36 in its axial direction for engaging the same with and disengaging it from the teeth of the pinion 8. The arm on line 50 carrying the grinding cylinder 36 is slidably guided in ways at 42 rotating synchronously with the eccentric shaft about an axis at point 42 parallel to one of the axes of the eccentric shaft and the axis of rotation of the ways at 42 is offset from the axis of the bearings of the eccentric shaft in the baseplate by a distance equal to the radius $R_{40}$ of the pitch circle 40 of the annular gear wheel 4. Naturally, there is also the possibility, which may be useful in practice, of a kinematic reversal in which the axis of the grinding cylinder 36 together with the means for axially moving the grinding cylinder 36 are fixed and the baseplate together with the rotatable parts which it supports swing in a circular arc about the swivel axis.

Generally, it should be observed that the gear teeth of the proposed gear machine naturally must also satisfy the known laws and needs that apply to all gearings. For instance, the necessary tooth flank clearances and the necessary tip clearances must be provided.

The principles relating to minimum number of teeth and maximum number of teeth in working pairs consisting of an internal gear and an external gear naturally likewise apply.

The gear teeth of the annular gear wheel 4 will be hereinafter described in greater detail with reference to FIG. 6. In the annular gear wheel 4, shown in the drawing, the base circle 35 has a radius $R_{35}$. A hypocycloid 33 for defining the tooth flanks is generated by the rolling of a rolling circle 34 of radius $R_{34}$ on the base circle 35. A point 38 on the rolling circle 34 generates the cycloid 33. The same cycloid 33 is also generated by a rolling circle 34', of radius $R'_{34} = R_{35} - R_{34}$, rolling on the base circle 35 in the opposite direction. In the illustrated example, the annular gear wheel 4 has nine teeth. Consequently, as has already been described above, the radius $R_{34}$ of the rolling circle 34 must be two-ninths or four-ninths or that of 34' must be seven-ninths or five-ninths of the radius $R_{35}$ of the base circle 35, unless Eaton gears are to be generated. The preferred proportion of 7 : 9 or 2 : 9 will be chosen for the radius $R'_{34}$ or $R_{34}$, respectively, of the rolling circle 34' or 34, respectively, to the radius $R_{35}$ of the base circle 35. For generating the teeth of the annular gear wheel 4, the axis 37 of the grinding cylinder 36 is therefore conducted along the line of the hypocycloid 33, which closes upon itself in two revolutions. Hence, the periphery of the grinding cylinder 36, which has a radius $R_{36}$, will move along a curve 32 which is equidistant from the hypocycloid 33. It will be further understood from the drawing that this equidistant curve 32 does not contact both the relatively remote flanks 4a and 4b of two neighboring teeth of the annular gear wheel 4. It makes contact merely with the right-hand flank 4b of one tooth (viewed from the center of the annular gear wheel 4) so that this flank will assume the exact shape of the equidistant curve 32. The grinding cylinder 36 clears the left-hand flanks 4a of the teeth. Consequently, the reactive forces acting on the grinding cylinder 36, during grinding, are reduced. Moreover, when the grinding cylinder 36 wears, it can be in-fed towards the right-hand tooth flank. Another matter that will be understood from the drawing is that the annular gear wheel blank 4 has been rough machined before being ground and hardened in such a way that in the region outside the base circle 35, the grinding cylinder 36 will run clear. In this region, which is not ground, no contact occurs between the annular gear wheel 4 and the pinion 8. The teeth are therefore ground only in the region marked 4d.

Figure 6:
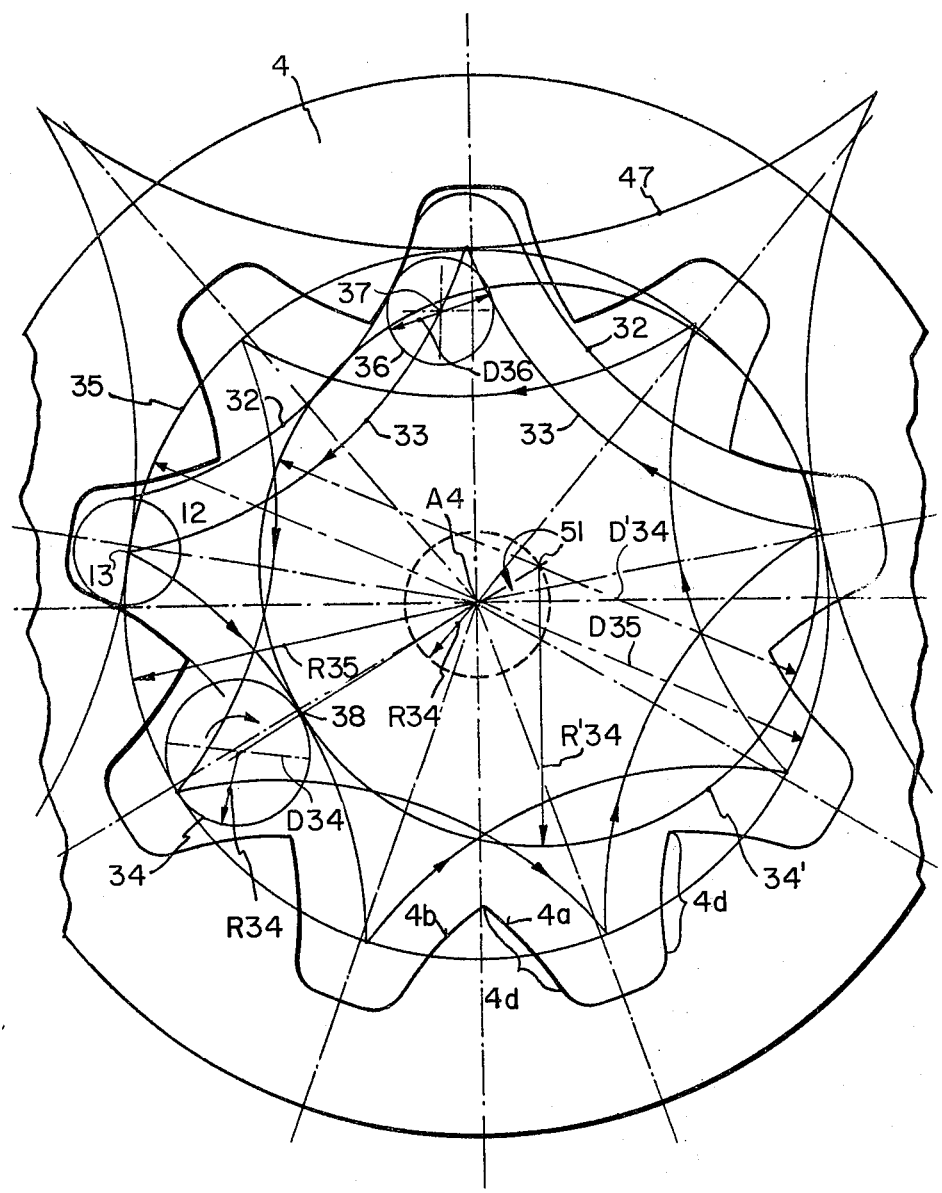
FIG. 6 illustrates the geometrical relationships of an annular gear wheel for use in the pump of the previous figures, in accordance with one embodiment of the present invention, and a method of forming the same.

From this short explanation with reference to FIG. 6, it will already be clear that by proceeding in accordance herewith, i.e., by conducting the axis 37 of a grinding cylinder 36 along the line of a hypocycloid 33 of the above defined kind, it is possible to grind an unusual tooth flank. When, in FIG. 6, all the right-hand tooth flanks have been ground, it is sufficient, for instance, to index the table to which the annular gear wheel 4 has been affixed, through a suitable angle for all the left-hand tooth flanks to be reached by the grinding cylinder 36. In order to facilitate an understanding of the process, this description is based on the tacit assumption that the grinding cylinder 36 does not wear and need not be fed to the work, and that the entire tooth flank is ground in one traverse. Naturally, in practice, this will not be the case and the grinding cylinder 36 must have an exactly defined diameter during the final traverse in which substantially no further material is removed. Moreover, in practice, the entire depth of material that requires removal is naturally removed in a large number of passes. Consequently, the grinding cylinder 36 must be fed radially outwards in the annular gear wheel 4 during the machining process. These details, which are well understood in grinding technology, are not here specially described in order to avoid obscuring the relevant issues.

Reference is made to FIG. 7 which shows the geometrical relationships and the preferred method of grinding the teeth of a pinion 8 which will mesh with and be utilized with the trochoidally-generated annular gear wheel 4 as described. The Figure shows several of the teeth of the pinion 8 as well as the contours of part of an annular gear wheel 4. The latter has a pitch circle 40 having a radius $R_{40}$. The pitch circle 41 of the pinion 8 has a radius $R_{41}$. The momentary point of contact of the two pitch circles is at 42. The center $A_8$ of the pinion 8 is always located on the line connecting the center $A_4$ of the annular gear wheel 4 and this point of contact 42. The rolling motion of pinion 8 in the annular gear wheel 4 can be readily simulated by mounting the pinion 8 on a table which rotates about the center $A_8$ of the pinion 8. This table is itself mounted on an eccentric shaft which rotates about the center $A_4$ of the annular gear wheel 4, assumed to be fixed. The ratio of the speed of rotation of the eccentric shaft about the center $A_4$ of the imaginary annular gear wheel 4 to the speed of rotation of the table carrying the pinion 8 and rotating on the free or driven portion of the eccentric shaft about the center $A_8$ of the pinion 8 equals the ratio of the number of teeth of the pinion 8 to the difference between the number of teeth of the annular gear wheel 4 and the pinion 8 or that of the pitch circle radius $R_{41}$ of the pinion 8 to the difference between the pitch circle radii $R_{40}$ and $R_{41}$ of the annular gear wheel 4 and the pinion 8, respectively. The hands of rotation are opposite. Accordingly, as shown in FIG. 7, the two outermost tooth flanks of a group of teeth (which comprises two teeth in FIG. 7) which, in the annular gear wheel 4, are enveloped by an equidistant curve from at least one cycloid, are instead defined by a circular arc 39 which touches the equidistant curve near the tips of both teeth. The arc 39 must be so determined that, throughout the region of the tooth flanks, it is the same or a greater distance away from its center 45 than the equidistant curve defining the tooth flanks of the actual annular gear wheel 4. This arc 39 has the radius $R_{39}$. Its center 45 must clearly lie on the bisector 46 through the center $A_4$ of the annular gear wheel 4 of the groups of teeth embraced by one cycloid arc. Moreover, the centers of the radii of curvature of the cycloid 33 defining a tooth flank of the actual annular gear wheel 4 are located on the involute 47, as shown in FIG. 7. The involute 47 is the locus of all the centers of curvature of the cycloid. Part of the involute 47 is shown in FIG. 7. Since, in the preferred embodiment, the grinding cylinder 36, which is conducted along the cycloid 33, first grinds all right-hand tooth flanks during a grinding cycle and then all left-hand tooth flanks, the cusp at the apex of the involutes 47 in FIG. 7 is not suitable as a center for the radius of curvature of the approximating circle 39. The center 45 must be a point in proximity with the intercept of the involutes 47 and the straight line 46. A center 45 for the approximating circle 39 can thus be found.

Another simple and better way of finding the center of the approximating circle 39 is to draw the tooth form of the annular gear wheel 4 on a much enlarged scale, inserting the bisector 46 through the center $A_4$ of a group of teeth of the annular gear wheel 4 embraced by one arc 39 of the cycloid and then finding the suitable radius $R_{39}$ by trial and error using a pair of dividers. This course will be adopted when, as is also possible, the equidistant curve 32 from the hypocycloid 33 defining the tooth profile of the annular gear wheel 4 touches two relatively remote tooth flanks of the end teeth of the group embraced by the cycloid arc 39. At least in the region of the upper halves of the teeth of the imaginary annular gear wheel 4, the distance of the circular arc 39 from the equidistant curve 32 must be as small as possible.

The tooth flanks of the pinion 8 are thus replaced by a grinding cylinder 36 which pivots about the center 45 of an equivalent circular arc 39, the grinding cylinder 36 pivoting in such a way that the envelope curve of all positions of the grinding cylinder 36 is the circle 39. The line through the axis of the grinding cylinder 36 to the center 45 of the circle 39 is marked 48.

By ensuring that 48 always passes through the osculating point of the two pitch circles 41 and 40, and this can be done with the aid of a guide means by rotating a rod representing the line 48 about the center of the non-eccentric or driving portion of the eccentric shaft, (i.e., about the center 44 of the pitch circle 40 of the annular gear wheel 4) at the same speed at which the eccentric shaft rotates, grinding cylinder 36 can be made to machine the teeth of the pinion 8 for as long as the latter is in mesh with the equivalent tooth contour of the annular gear wheel 4 represented by the circle 39.

Since, when the ratio of the number of teeth of the pinion 8 to that of the annular gear wheel 4 is not equal to the ratio of the diameter $D_{34}$ of the rolling circle 34 of the cycloid 33 determining the shape of the teeth of annular gear wheel 4 to the diameter $D_{35}$ of the relative base circle 35, the grinding cylinder 36 may machine the teeth of the pinion 8 only when it is in the region of a tooth flank of the annular gear wheel 4 and not when it traverses the gap between two teeth of the annular gear wheel 4. The grinding cylinder 36 must be withdrawn from the working zone perpendicularly to the plane of the drawing in FIG. 7 during each such traverse. For as long as the grinding cylinder 36 is in the region of a tooth of the imaginary annular gear wheel 4, it will machine the corresponding parts of the teeth of the pinion 8. The parts of the tooth contour of the pinion 8, that are not to be ground, have been machined to a correspondingly greater depth during the roughing-out of the pinion 8, as indicated at 49. If the pinion 8 satisfies the condition that its number of teeth bears the same number of teeth of the annular gear wheel 4 as the rolling circle 34 of the cycloid 33 defining the annular gear wheel 4 tooth contour to its base circle 34 and if the individual arcs 39 of the cycloid embrace only two neighboring teeth, then a retraction of the grinding cylinder 36, while traversing a gap between the teeth of the annular gear wheel 4 will be unnecessary. In such a case, grinding cylinder 36 grinds both flanks and the crest of the tooth of the pinion 8 in one pass and is withdrawn from engagement with the pinion blank 8 only during return along its circular arc 39.

In an apparatus for carrying out the method of FIG. 7, as more fully described in copending application 173,110, the base carries a support which itself carries an arm, corresponding to line 48, that can swivel about an axis, corresponding to the point 45. The grinding cylinder 36 is mounted on the arm at a distance 50 from the axis 45. The arm is slidably guided in a sliding block which is deflectably mounted to swivel about an axis at point 42. The sliding block is mounted on a shaft in an arm secured to a driving gear wheel and rotates together therewith. The distance $R_{40}$ of the shaft at point 42 from the axis $A_4$ about which the eccentric driven portion of the eccentric shaft carrying the table rotates is equal to the pitch diameter of the annular gear wheel 4.

Figure 8:
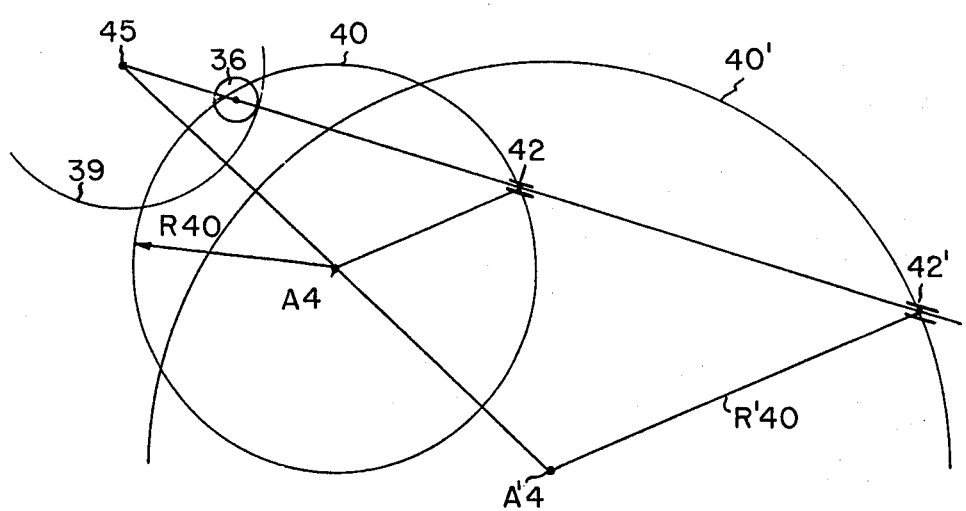
FIG. 8 illustrates a modified form of the geometrical relationships and method illustrated in FIG. 7.

Naturally, when work begins, the several parts must be placed into the correct angular positions. In other words, the angular position of the pinion blank 8 prior to grinding not only must be adjusted to the position of the teeth, the shaft at point 46 in FIG. 8, must likewise be coplanar with the two axes of the eccentric shaft. Moreover, an in-feeding mechanism for the grinding cylinder 36 must be provided, since the latter, in practice, cannot remove sufficient material from the tooth flanks of the pinion 8 in a single traversing pass.

Furthermore, the withdrawal of the grinding cylinder 36 from engagement with the pinion 8, that is to be ground, must not take place until the center line of arm along line 48 passes across the tip of an imaginary tooth of the annular gear wheel 4. This is possible because the pinion 8 has been roughed-out with an allowance where the tips of the teeth of the annular gear wheel 4 engage the gap between teeth of the pinion 8, as indicated in FIG. 7 at 49. Moreover, in a kinematic reversal of the described procedure, the arm along line 48 may remain stationary and the work together with the machine below could be swung about point 45. This has the substantial mechanical advantage of permitting the process to be performed on conventional machine tools.

Finally, it should be observed that the involute 47 of the cycloid 32, as can be readily provided by mathematic calculation, is likewise a hypocycloid. This hypocycloid can also be generated by a gear drive mechanism such as that employed in the grinding of the annular gear wheel.

It is completely synchronous with the hypocycloid generating the teeth of the annular gear wheel 4. Each position of point 42 is associated with a particular exactly defined point on the involute 47. If arrangements are made for point 42 on the rod along line 48 not to stand still but continuously to travel on 47 (FIG. 7), and this can be readily accomplished by appropriate gearing, then the pinion 8 can be ground by the grinding cylinder 36 as a precise enveloping contour of an annular gear wheel 4. However, this procedure is far more complicated than the above-described method of substituting for the annular gear wheel 4 an equivalent annular gear defined by circular arcs 39, because the pivot point 45 is then stationary.

If the above description and FIG. 7 are carefully analyzed, it will become apparent that the arm attached to the driving gear wheel and the sliding block will collide with the grinding cylinder 36 upon passing through the position nearest point 42.

In an arrangement according to FIG. 7, this cannot be avoided in the case of some relative proportions. However, the difficulty can be easily overcome in a way that will be understood by reference to FIG. 8. In the arrangement shown in FIG. 8, the arm secured to the driving gear does not rotate about the axis $A_4$ but about the produced axis $A'_4$ of the line connecting center 45 and center $A_4$. The point 42' which corresponds to the point 42 in FIG. 7 rotates about the axis $A'_4$ at the end of a radius $R'_{40}$, which bears the same proportion to the radius $R_{40}$ as the distance 45-$A'_4$ to the distance 45-$A_4$. If point 42' is now allowed to rotate about the axis $A'_4$ at the same angular speed as the point 42 previously did about its axis $A_4$, then the point 42', which naturally must be located on an extension of the arm along line 48 will always remain on the same ray from point 45 upon which point 42 moves. Hence, an arm rotating about the point $A'_4$ at the end of the radius $R'_{40}$ likewise can be provided with a slideway at 42' for an extension arm. This arm carries a grinding cylinder 36 at the same distance from point 45 as the guide arm, and the grinding cylinder 36 will thus perform the same movements as in the construction according to FIG. 7. However, from the positions of the circles 39 and 40', it will be understood that a collision between the grinding cylinder 36, the arm and its slideway cannot occur. This form of construction is, in effect, merely a modification of the form of construction according to FIG. 7 which takes advantage of the theorem of sweeping rays.

There are certain dimensions and proportions which are desirable and preferred in the construction of a gear machine in accordance with the last-mentioned technique. First of all, the diameter of the addendum circle of the pinion should be at least one tooth height smaller than the diameter of the dedendum circle of the annular gear wheel. This, of course, is inherent in the construction since a filler piece is utilized as previously described. It is also highly desirable that the distance between the equidistant curve and the hypocycloid should be slightly less than half the distance between the ground portions of facing flanks of a pair of neighboring teeth of the annular gear wheel at their closest point. In addition, the distance between two facing tooth flanks of a pair of neighboring teeth of the annular gear wheel at the fixed or pitch circle should be approximately equal to the width of a tooth at the fixed circle. Other proportions and dimensions will, of course, be obvious from the previous description and to those skilled in the art of the construction of gear machines.

An alternative method and apparatus for grinding the tooth flanks of an annular gear wheel 4 and a pinion 8, to produce teeth of the shape produced in accordance with application 173,110, is set forth in copending application Ser. No. 392,501, filed Aug. 29, 1973 by Hermann Harle, Siegfried Eisenmann and Hartmut Rettich and entitled "Method and Apparatus for Grinding the Tooth Flanks of Internally-toothed Gear Wheels," the disclosure of which application is incorporated herein by reference.

It will be obvious to those skilled in the art that many modifications may be made within the scope of the present invention withough departing from the spirit thereof, and the invention includes all such modifications.

What is claimed is:

1. A gear machine comprising a housing, an internally-toothed, annular gear wheel rotatably positioned in said housing and having from 9 to 15 teeth, an externally-toothed pinion adapted to mesh with said annular gear wheel and having two teeth less than said annular gear wheel, the diameter of the addendum circle of said annular gear wheel being smaller than the diameter of the addendum circle of said pinion, and a generally crescent-shaped filler piece radially filled and extending over a predominant portion of the length of the free space between the addendum circle surface of said pinion and the addendum circle surface of said annular gear wheel on the side of said machine opposite the point of deepest tooth mesh of said pinion and said annular gear wheel, said filler piece having one cylindrical surface, on the annular gear wheel side thereof, defined by said addendum circle surface of said annular gear wheel and its other cylindrical surface, on the pinion side thereof, defined by said addendum circle surface of said pinion; whereby said addendum surfaces of said annular gear wheel and said pinion sealably glide along said cylindrical surfaces of said filler piece, respectively, and at least the end of said filler piece which is pointing in the direction of rotation is shortened and terminates substantially at a position at which the trailing end of said addendum surface of one tooth of said annular gear wheel and the trailing end of said addendum surface of one tooth of said pinion simultaneously come out of contact with the corresponding cylindrical surfaces of said filler piece.

2. A gear machine in accordance with claim 1 wherein the end edges of the cylindrical surfaces of the filler piece pointing in the direction of rotation terminate substantially on a plane parallel to the axes of the annular gear wheel and the pinion and passing through a point midway between said axes of said annular gear wheel and said pinion; said plane being further passed by the trailing end of the addendum surface of each tooth of said pinion simultaneously with the trailing end of the addendum surface of a tooth of said annular gear wheel.

3. A gear machine in accordance with claim 1 wherein the trailing end of the addendum surface of a tooth of the pinion passes the trailing end of a fluid opening in the housing after it has overtaken the leading end of the addendum surface of a tooth of the annular gear wheel which has, simultaneously with said tooth of said pinion, come out of contact with the end of the filler piece.

4. A gear machine in accordance with claim 1 wherein both ends of the filler piece are shortened by the same amount.

5. A gear machine in accordance with claim 1 wherein the outermost flanks of two neighboring teeth of the annular gear wheel are defined by a common circular arc.

6. A gear machine in accordance with claim 1 wherein the annular gear wheel has eleven teeth.

7. A gear machine in accordance with claim 1 wherein the annular gear wheel has nine teeth.

8. A gear machine in accordance with claim 1 wherein the filler piece is fixedly seated in at least one of the end walls of the housing.

9. A gear machine in accordance with claim 1 wherein the filler piece is fixedly seated in both of the end walls of the housing.

10. A gear machine in accordance with claim 1 wherein the pinion is provided with axially-disposed passages.

11. A gear machine in accordance with claim 1 wherein at least the effective portions of the tooth flanks of the annular gear wheel and the pinion are hardened and ground.

12. A gear machine in accordance with claim 1 which includes a drive shaft operatively coupled to the pinion, a fluid inlet and a fluid outlet and the shortened end of the filler piece is located adjacent said outlet opening.

13. A gear machine in accordance with claim 1 which includes a driven shaft operatively coupled to the pinion, a fluid inlet and a fluid outlet and the shortened end of the filler piece is located adjacent said inlet opening.

14. A gear machine in accordance with claim 1 wherein said machine is symmetrical with respect to a plane of symmetry through the axis of the annular gear wheel and the axis of the pinion, whereby the operation of said machine is reversible.

15. A gear machine in accordance with claim 1 wherein the filler piece is provided with a pair of projections, extending from at least one side and along about one-third of each end of said filler piece, and said projections are fixedly seated in complementary openings in at least one end wall of the housing.

16. A gear machine in accordance with claim 15 wherein the projections extend from both sides of the filler piece and are seated in openings in both end walls of the housing.

17. A gear machine in accordance with claim 1 wherein at least one edge of the teeth of the pinion has a shallow cut-out portion extending along the addendum surface thereof and forming a sharp-edged shoulder at a point along the length of said addendum surface.

18. A gear machine in accordance with claim 16 wherein the cut-out portion has a radial dimension of a fraction of a millimeter.

19. A gear machine in accordance with claim 1 wherein the diameter of the addendum circle of the pinion is 0.5 to 0.8 modules greater than the diameter of the addendum circle of the annular gear wheel.

20. A gear machine in accordance with claim 19 wherein the diameter of the addendum circle of the pinion is 0.7 modules greater than the diameter of the addendum circle of said annular gear wheel.

21. A machine in accordance with claim 1 wherein the teeth of the annular gear wheel have a trochoidal form.

22. A gear machine in accordance with claim 21 wherein the diameter of the addendum circle of the pinion is at least one annular gear wheel tooth height smaller than the diameter of the dedendum circle of the annular gear wheel.

23. A gear machine in accordance with claim 21 wherein at least the effective portions of the tooth flanks of the annular gear wheel are defined by a curve equidistant from a hypocycloid and wherein the ratio of the diameter of the rolling circle to the diameter of the fixed circle, by which the hypocycloid is generated, is an aliquant fraction whose denominator is equal to the number of teeth of the annular gear wheel and whose numerator is at least two and not more than the number of teeth of the annular gear wheel minus two and the effective tooth flanks of the pinion are at least approximately determined by the rolling off of the pinion in the annular gear wheel.

24. A gear machine in accordance with claim 21 wherein the effective portions of the tooth flanks of the pinion are determined by rolling off of the pinion in an auxilliary, annular gear wheel, having effective tooth flanks defined by circular arcs, said circular arcs touch the tooth flanks of the annular gear wheel, which actually meshes with the pinion, at least approximately at the addendum, the radii of the circular arcs are at least equal to or slightly larger than the radius of curvature of the equidistant curve at the point of contact, the effective portions of the outermost tooth flanks of two adjacent teeth of said auxilliary, annular gear wheel, which face the tips of the cycloidal arc that enclose the same, are defined by said circular arcs and the effective portions of the tooth flanks of said pinion are ground.

25. A gear machine in accordance with claim 21 wherein the number of teeth of the annular gear wheel and the number of teeth of the pinion have no common divider.

26. A gear machine in accordance with claim 21 wherein one of the left-hand tooth flanks and right-hand tooth flanks of the annular gear wheel is defined by a first curve equidistant from a first hypocycloid and the other of said left-hand and right-hand tooth flanks is defined by an equidistant curve from a second, like hypocycloid angularly displaced from said first hypocycloid said hypocycloids having a common center and rotating against one another.

27. A gear machine in accordance with claim 26 wherein the distance of the equidistant curve from the hypocycloid is slightly less than half the linear distance between the ground portions of facing flanks of a pair of neighboring teeth of the annular gear wheel at the point where said portions are closest.

28. A gear machine in accordance with claim 26 wherein the distance between two facing tooth flanks of a pair of neighboring teeth of the annular gear wheel at the fixed circle is approximately equal to the width of a tooth flank at said fixed circle.

* * * * *

UNITED STATES PATENT OFFICE
CERTIFICATE OF CORRECTION

PATENT NO. : 3,907,470
DATED : September 23, 1975
INVENTOR(S) : Hermann Harle, Siegfried Eisenmann and Kurt Sickinger It is certified that error appears in the above-identified patent and that said Letters Patent are hereby corrected as shown below:

Column 4, line 64, "each" should read - - - ease - - -.

Column 5, line 28, "2,024,330" should read - - - 2,024,339 - - -.

Column 6, line 57, "engagementfree" should read - - - engagement-free - - -.

Column 10, line 30, "expalined" should read - - - explained - - -.

Column 14, line 60, "$R_{35}$" should read - - - $R_{34}$ - - -.

Column 23, line 26, "filled" should read - - - filling - - -.

Column 24, line 57, "claim 16" should read - - - claim 17 - - -.

Signed and Sealed this sixteenth Day of December 1975

[SEAL]

Attest:

RUTH C. MASON
Attesting Officer

C. MARSHALL DANN
Commissioner of Patents and Trademarks